M. T. CHAPMAN.
PUMPING APPARATUS.
APPLICATION FILED OCT. 30, 1918.

1,385,069. Patented July 19, 1921.
6 SHEETS—SHEET 1.

M. T. CHAPMAN.
PUMPING APPARATUS.
APPLICATION FILED OCT. 30, 1918.

1,385,069.

Patented July 19, 1921.
6 SHEETS—SHEET 2.

M. T. CHAPMAN.
PUMPING APPARATUS.
APPLICATION FILED OCT. 30, 1918.

1,385,069.

Patented July 19, 1921.
6 SHEETS—SHEET 4.

UNITED STATES PATENT OFFICE.

MATTHEW T. CHAPMAN, OF AURORA, ILLINOIS, ASSIGNOR TO THE AMERICAN WELL WORKS, OF AURORA, ILLINOIS, A CORPORATION OF ILLINOIS.

PUMPING APPARATUS.

1,385,069.      Specification of Letters Patent.      Patented July 19, 1921.

Application filed October 30, 1918. Serial No. 260,295.

*To all whom it may concern:*

Be it known that I, MATTHEW T. CHAPMAN, a citizen of the United States, and a resident of Aurora, in the county of Kane and State of Illinois, have invented certain new and useful Improvements in Pumping Apparatus, of which the following is a specification, reference being had to the accompanying drawings.

This invention relates to mechanism designed primarily for use as a means for irrigating lands lying adjacent to a body of water, as a river, and from which body of water the land is separated by a protecting structure, as a levee, or which may be alternatively employed to force back into the river or other body of water any water that has overflowed the land. While the pumping of water for irrigating and drainage purposes are the principal uses that I contemplate employing the mechanism for, it is to be understood that the invention may be otherwise advantageously employed, as for example, under some conditions, in the pumping of large quantities of sewage. The invention will, however, be herein described in connection with the pumping of water from overflowed land to an adjacent body of water which will for convenience be hereinafter referred to as a river, and the pumping of water upon the land for irrigating purposes.

The leading objects of the invention are to provide simple and effective mechanism for accomplishing the above stated pumping operations, which mechanism can be readily installed upon an embankment or protecting levee, and when so installed will be so positioned that in pumping water off of the land the discharging end of the apparatus will be totally submerged in the river whereby a downward pull is produced on the water in the discharge pipe such as is produced by an ordinary pump when creating a vacuum, thus causing a siphoning effect that results in a saving of power in operating the pumping elements: also, to provide improved means for automatically preventing the flooding of the land by a siphoning action at times when the pumping mechanism is out of operation and the height of the water in the river is such as to cause such a result if means were not taken to prevent it; and, also, to provide means for affording, when desired, an unobstructed and unaided flow of water either from the river to the land or vice versa through conduits passing through the embankment or levee with which conduits the inlet and outlet water passages that constitute a part of the apparatus will normally be in communication. Other objects of the invention are to provide improvements in various parts that enter into the construction of the apparatus. These various objects I accomplish by the devices and combinations of devices illustrated in the drawings and hereinafter particularly described. That which I believe to be new and desire to cover by this application is set forth in the claims.

Referring to the several figures of the drawings, 15 indicates a portion of a levee or embankment alongside of a river or other body of water and designed to protect the adjacent land from being overflowed. The portion of such levee shown in the drawings is preferably of concrete or other similar firm material for the purpose of affording a secure foundation for the pumping means about to be described and the protecting housing therefor. In such portion of the levee are formed two inclined passageways of a size and shape to properly receive and hold a suction or inlet pipe and a discharge pipe. These pipes are placed at a short distance from each other at their upper ends and diverge downwardly toward the land and river, respectively, so that water may be forced through them and through a member that connects them near their upper ends. In the drawings the suction pipe referred to is indicated by 16, the discharge pipe by 17 and the connection at their upper ends by 18. As it is important to make provision for withdrawing the suction pipe 16 together with the pumping elements contained therein I provide a tube in the passageway formed through the land side part of the levee, which tube constitutes a comparatively smooth lining for such passageway and affords means for providing suitable guides upon which the suction pipe may be moved longitudinally with comparative ease. This tubular lining that I have referred to is indicated by 19. While various constructions of guiding means may be employed, I have shown a simple construction consisting of a rail 20 extending longitudinally of the suction pipe and riveted to the outer face thereof, which projects into a trackway in the tube 19,—such trackway being constructed by leaving a space between adjacent longitudinal edges of two of the sheets that form the tube 19 and bridging such space by a strip 21 which is riveted to the outer faces of such two sheets and over the joint between them (see Figs. 5, 6 and 7). This construction will be duplicated near opposite sides of the suction pipe and its inclosing tube, and by reason of the two rails 20 projecting between the separated sheets there will be provided reliable guiding means for aiding in the insertion or withdrawal of the suction pipe and which will also act to hold such suction pipe against rotary movement.

Figures 3, 5:
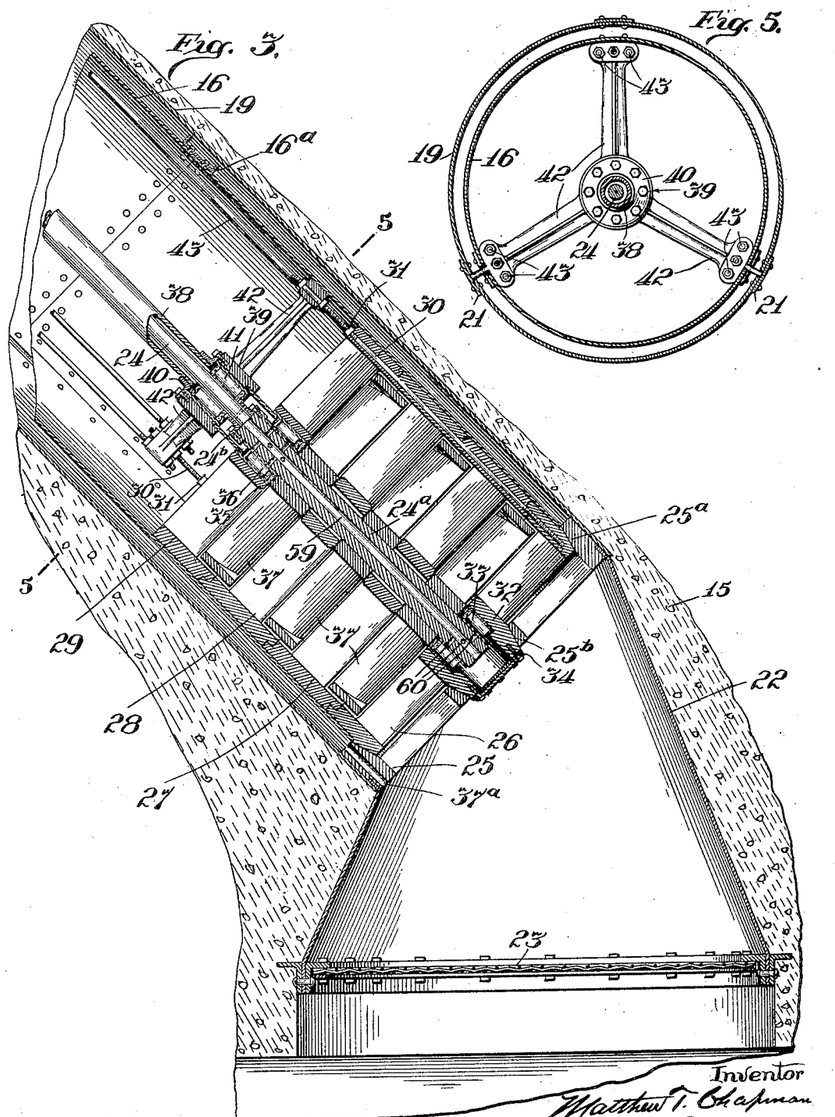
Fig. 3 is an enlarged detail showing in section the lower portion of the suction or inlet pipe, the tube that incloses it, the fixed supporting means for the lower end of the suction pipe, and the rotating pumping elements and the stationary members interposed between such elements.
Fig. 5 is a cross-section taken at the line 5—5 of Fig. 3 and showing a plan view of one of the centrally-located shaft-bearings.
Figure 10:
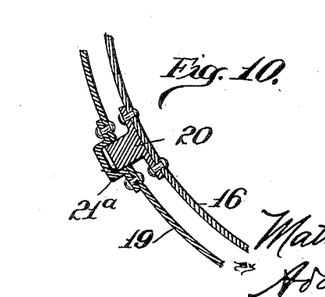
Fig. 10 is an enlarged detail illustrating a modification in the means for slidably securing the suction pipe to the outer tube surrounding it.

In Fig. 10 I have shown a modification wherein the space between the separated sheets of the tube 19 is bridged by an outwardly bowed member 21ª instead of by a flat bridging member 21 as in Fig. 5. By employing such a bowed bridging piece an engaging rail 20 can be employed that will have a better and stronger engagement with the tube 19 inasmuch as it can project not only into the space between the separated sheets of the pipe 19, but beyond such sheets into the bowed portion of the bridging member, as well illustrated in Fig. 10.

Figures 4, 6, 7:
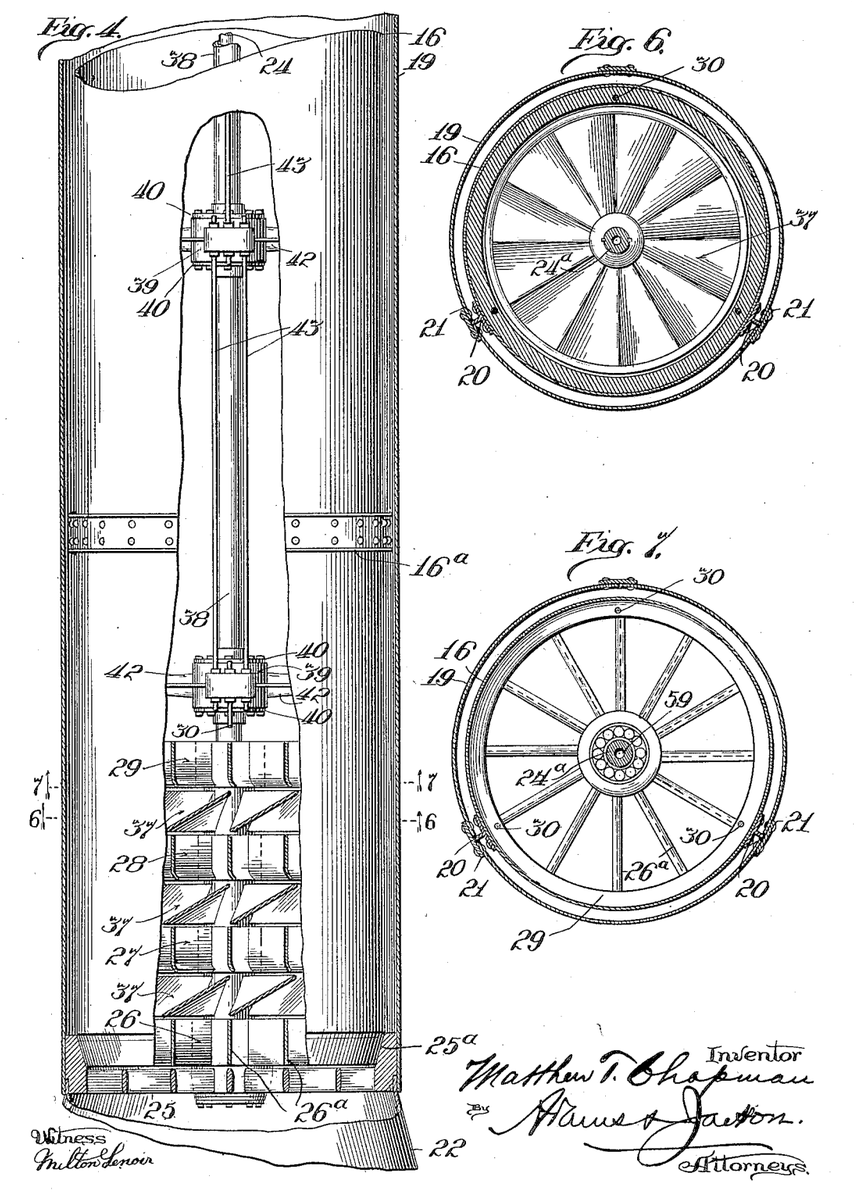
Fig. 4 is a side elevation of the lower portion of the suction pipe, a portion of the wall of which is broken away to show the rotating pumping elements and the stationary annular devices interposed between them that counteract the whirling tendency of the rising column of water,—the tube in which the suction pipe is located being shown in section.
Fig. 6 is a cross-section taken at line 6—6 of Fig. 4 through one of the propeller wheels.
Fig. 7 is a cross-section taken at line 7—7 of Fig. 4.
Figure 8:
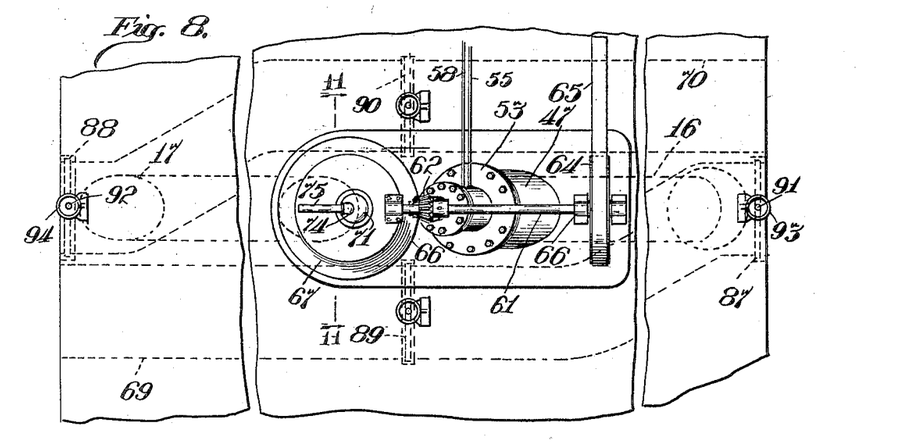
Fig. 8 is a plan view, partly broken away, of the parts shown in Fig. 1, and with the housing shown in said Fig. 1 removed.
Figure 9:
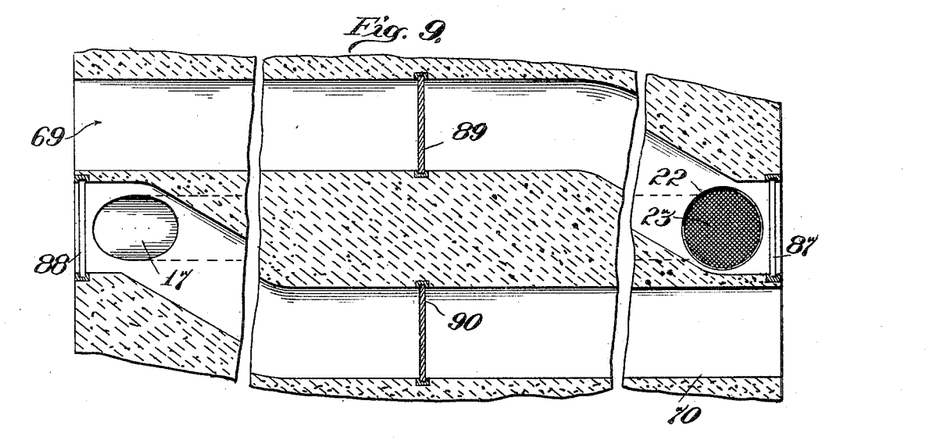
Fig. 9 is an inverted sectional view taken at line 9—9 of Fig. 1, portions of the foundation being broken away.

The suction tube will, of course, be made up of cylindrical sections secured together at their abutting ends, and in so securing them I do it in the construction shown by means of annular channel shaped strips 16ª that overlie the joints between such tube sections and are riveted in place, as shown in Figs. 3 and 4,—the flanges of such channel shaped strips projecting outwardly and close to the inner face of the tube 19. Such construction not only firmly unites the several sections of the tube together, but by reason of the channel form effectually prevents the pipe from becoming flattened or distorted. Secured to the lower end of the tube 19 is a funnel, indicated by 22, which has secured in it adjacent to its open lower end a strainer 23 through which the water passes to be drawn up through the suction pipe.

24 indicates a rotatable pump shaft extending centrally throughout the suction pipe and having secured to it on its lower end portion propellers for drawing in and forcing up the water to be pumped. The lower portion of the shaft to which the propelling devices are attached is preferably separately formed from the upper portion and of somewhat larger diameter than such upper portion in order that it may be provided with a lubricant opening therethrough by which certain of the bearings may be lubricated, as hereinafter described. This lowermost and enlarged portion of the shaft is indicated by 24ª. It is shown as being secured to the main portion 24 (see Fig. 3) by means of a flanged coupling 24ᵇ riveted or otherwise secured to the shaft 24 and having its flange resting upon and bolted to a slightly enlarged head portion of the part 24ª.

25 indicates a member secured in the lower end of the outer tube 19 by any suitable means, such member being of wheel form—that is, it comprises a rim, straight radial spokes and a hub. The inner face of the rim portion is beveled as at 25ª and the inner face of the hub portion is beveled as at 25ᵇ (see Fig. 3) to make close fitting bearings between such surfaces and correspondingly-shaped surfaces of the parts carried by the suction tube, thereby providing a tight fit between the lower ends of such pipe and tube. These abutting surfaces are preferably machined so as to insure accurate fits. The member just referred to as being carried at the lower end of the suction pipe and having a close fit upon the wheel-like member 25 is indicated by 26 and comprises another wheel-like structure the rim of which is as shown extended up some little distance beyond the top surface of the spoke members. The spoke members are preferably in the form of narrow blades and lie opposite the spokes of the fixed part 25 so as to offer no obstruction to the passage of water rising between the spokes of the member 25. 27—28—29 indicate other members arranged one above the other and separated by a considerable space from each other, all of such devices being substantially similar to and for the same purpose as the member 26 except that the lower edge portions of their radial blade-like spokes are slightly turned laterally for the purpose of counteracting the whirling movement of the water that is produced by the action of the propelling means that forces the water up through them. The intermediate members 27 and 28 have their rim portions extending both above and below the upper and lower edges of the blades, and the upper member 29 has its rim portion extending only downward, (see Fig. 3). These various rim portions abut against each other as shown, and are preferably interlocked as by a rabbet joint as shown, and there are left between these various stationary members 26—27—28—29 considerable spaces in which are located the propellers hereinafter referred to. These stationary members are secured together by rods 30 passing down through them and screwed into the rim of the lowermost member as shown, or otherwise made fast to such rim, and said members are clamped together by the screwing down of nuts 31 against the face of the rim of the member 29. The lower member 26 has an enlarged hub portion 32, the lower end of the outer face of which is machined to form a true beveled surface that accurately fits against the beveled hub of the supporting member 25, and in the interior of this hub 32 are located a series of anti-friction rollers 33 that bear against the lower end of the shaft member 24ª. 34 indicates a plate covering the open lower end of the hub 32 and secured in place by bolts or otherwise. Preferably a packing member will be located against the inner face of such plate so as to more effectually guard against the admission to the lower bearing of any of the water being pumped. The upper fixed member 29 is also provided with an enlarged hub, indicated by 35, within which are a set of anti-friction rollers 36 bearing against the shaft section 24ª. 37 indicates propeller wheels, the hubs of which are secured in any suitable manner to the member 24ª of the rotatable shaft. I have shown three such propeller wheels each located between two of the stationary water-current controlling members, but it is to be understood that I do not confine myself to the number of such propellers and stationary members illustrated in the drawings. Each propeller wheel I prefer to make of sheet metal and so twist the outer ends of the blades that the angle will be sharper on the inner end than it is on the outer end, thus making a perfect curve so that the distance through such propeller blades will be the same on the inner ends as it is on the outer ends of the blades. The blades will, therefore, be more flat on their outer ends than on their inner ends and a helical curve will be produced that will cause the water to flow smoothly with the least possible resistance. The propeller wheels shown are each provided with a rim connecting their outer ends and I so prefer to make them, and a stronger device is thereby produced, but I do not limit myself to the use of a propeller with such a rim. Furthermore, the number of blades may vary considerably from the number shown.

Inasmuch as sediment may tend to collect in the annular space between the suction pipe 16 and the tube 19 I preferably provide the rim of the lower fixed member 25 with openings extending therethrough and communicating with such space, through which openings such sediment may be discharged. As many of such openings may be provided as desired. One such opening is shown in Fig. 3 and is indicated by 37ª.

38 indicates a tube that incloses and protects the rotatable shaft 24. As shown, it is made in sections, the sections extending between and being connected to bearing boxes 39,—such connecting of the tube sections with the boxes being preferably by flanged collars 40 screwed upon the ends of the sections and bolted to the boxes. Within each bearing box are located in the construction shown a series of anti-friction rollers 41 that properly bear against the shaft, and each end of each bearing box is to be tightly closed by cylindrical plates and pieces of felt or other suitable material to exclude any of the water being pumped from the interior thereof. Each bearing box 39 has formed with it a series of radial arms 42—three being preferably employed as shown—which extend out and abut against the inner face of the suction pipe 16. In order to hold the bearings perfectly stationary and centrally of the suction pipe I provide two of the arms 42 with end projections that extend through suitable openings in the pipe 16 and enter the same spaces or joints in the outer tube 19 as do the guiding rails 20. (See Fig. 5). By this arrangement such projecting ends of two of the arms 42 will also act as guiding devices in the same manner as the rails 20. Of course, it will be understood that the rails 20 must be made in sections with their ends spaced apart sufficiently to allow of the projection in the manner stated of the extensions on the arms 42. The outer portions of these radial arms are broadened (see Fig. 5) to permit the passing therethrough of rods or long bolts. These rods or long bolts connect the arms of one bearing with the corresponding arms of the next bearing, and I prefer to arrange them with two of the three bolts extending in one direction and the third bolt in the opposite direction, as indicated in Fig. 4,—the two bolts that extend in the same direction being the outer ones of the series of three, such arrangement insuring an even draw or pull on the arms of the bearings as a whole. Nuts are shown screwed on the ends of the bolts to hold them tightly in place. The screw-threaded rods or bolts referred to are indicated by 43 except those that depend from the lowermost set of arms 42 and those are designated, as hereinbefore stated, by the numeral 30 and serve to firmly connect the stationary water controlling members 29 with the lowermost set of arms 42.

44 indicates a cover plate extending over the upper end of the suction pipe 16 and inclosing pipe 19 and being bolted securely, in the construction shown, to a portion of a machinery base that rests upon the concrete foundation 15, such portion of the base being indicated by 45 and shown as inclined to conform to the inclination of the suction pipe and its inclosing tube. The upper end of the shaft inclosing casing 38 is connected to the under face of this plate 44, preferably by means of a flanged collar 46 screwed to the casing 38 and bolted to the plate.

47 indicates a cylinder rising above the plate 44 and preferably formed with it. 48 indicates a piston fixedly secured to the pump shaft 24. Said piston fits the bore of the cylinder snugly, but not so tightly as to interfere with the rotation of the shaft. 49 indicates a cross wall near the upper end of the chamber in the cylinder 47, thus forming a second and smaller chamber in which is mounted a mechanical bearing comprising an upper and a lower plate, indicated by 50 and 51, respectively, and a set of anti-friction rollers 52 interposed between them and movable in a raceway formed in the faces of said plates. The lower plate 51 is fixed in position while the upper plate 50 is secured to and turns with the shaft 24. The upper end of the cylinder 47 is closed by a cover 53 bolted to a flange of the cylinder and having formed with it one member of a packing box 54 through which the pump shaft passes. 55 indicates a pipe for supplying liquid lubricant under pressure to the bottom of the chamber in the cylinder 47 below the piston 48, such lubricant being forced thereto by a pump 56 that draws its supply from a tank 57. 58 indicates a pipe by which such portion of the lubricant as passes by the piston 48 will be returned to the tank 57.

During the operation of the pumping mechanism in the lower end of the suction pipe 16, the liquid lubricant referred to will be forced under pressure beneath the piston 48 causing such piston to rise slightly and thus in large measure relieve the mechanical bearing at the upper end of the chamber 47 from the great load that would otherwise be imposed upon it, and thus to a large extent obviating the wearing of such mechanical bearing parts and preventing the generation of heat that such wearing would cause. During the time that the liquid lubricant is thus fed under pressure below the piston, such piston will approximately support the lengthwise pull of the shaft and its attached parts, but owing to the inclined position of the shaft and the heavy work that it is called upon to perform there is more than the usual necessity for insuring a proper lubrication of all of the bearings of the shaft to obviate the wear that would otherwise occur on account of such inclined position. Such lubrication is afforded by the passage of the lubricant under pressure from the cylinder 47 through the upper bearing and down the pipe 38 that surrounds the shaft. Such lubricant will successively pass through and keep filled the several bearings afforded by the boxes 39 and upon leaving the lowermost one of such boxes it will follow down the shaft and enter a central opening 59 that extends from end to end of the shaft section 24ª, a portion of it being expelled through lateral passages 60 that communicate with the bearing members 32 and 35 that inclose the roller bearings 33 and 36 respectively. By the means described it will be seen, therefore, that not only does the liquid lubricating material that is forced under pressure beneath the piston 48 slightly raise and largely support such piston and the shaft and its parts connected therewith, but also is so forced above and below the piston as to keep properly lubricated every bearing for the shaft, and by its pressure prevents the liquid being pumped from entering the bearings.

The pump shaft is driven through the rotation of a shaft 61 having secured to it a bevel gear 62 that meshes with another bevel gear 63 secured upon the upper end of the pump shaft. The shaft 61 is supported in bearings on standards 66 mounted upon horizontal portions of the base 45 hereinbefore referred to, such shaft being driven from any suitable source of power through a pulley 64, and an endless belt 65 running thereover.

The passage 18 that connects the suction pipe 16 with the upper end of the discharge pipe 17 I prefer to form in a flattened form— that is, considerably wider from side to side than it is from top to bottom so that the full discharge of water pumped up through the suction pipe 16 will not have to be lifted as high as would be the case if such passage were of uniform diameter and as large as the diameter of the pipes that it connects. I thereby save power by not having to lift the water to so great an extent. The discharge passage 18 is shown as partly formed in the concrete foundation and partly formed by a covering member 67, which latter forms a portion of the base upon which the driving means is mounted. Of course, if desired, such communicating passage 18 might be made wholly of a piece of pipe flattened so as to produce a passage such as described.

68 indicates a building erected upon the portion 15 of the levee or embankment over the operating machinery.

While the pumping apparatus herein shown may be advantageously used by having the lower ends of the inlet and discharge pipes project beyond the embankment or levee portion 15, I prefer to form in the lower portion of such levee or embankment two cross-channels indicated, respectively, by 69 and 70, in which the water from the river and the water from the submerged land may freely flow, when certain gates hereinafter mentioned are opened, and with which the suction pipe and discharge pipe respectively communicate, the effect being, of course, the same as if such pipes were actually submerged in the water at the opposite sides of the levee. I prefer such gated channels, however, as it is sometimes desirable to allow water to flow from one side to the other without the intervention of any pumping operation, and further because by reason of such channels and the arrangement of gates with respect thereto I am able to utilize my improvements, in the manner hereinafter described, for pumping water from the river to the land for irrigating purposes.

When water is being pumped off of the land, if the pumping devices should fail for any reason or the pumping operation be discontinued there would be danger, in the event that the water in the river should be considerably higher than on the land side, that water from the river would be forced back, on the principle of a siphon, through the pipes 17, 18 and 16 and thus render the work that had been done of no avail, and, indeed, might result in even a greater overflowing of the land than before any pumping had been done at all. To avoid that happening I provide means for automatically destroying the partial vacuum in the pipes that would permit such siphoning operation. Referring now to such means, 71 indicates a small dome whose open lower end surrounds an opening 72 in the base or wall 67, such dome having a flange at its lower edge by means of which it is bolted to such base member 67. In the upper wall of the dome is an opening 73 that communicates with an elbow 74 into which is secured a section of pipe 75. 76 indicates a valve pivoted at 77 to the wall of the dome and adapted when swung up to close the opening 73, the face of the valve being, of course, provided with a suitable surface for effecting a tight closing of such opening. 78 indicates a lever pivoted at 79 to a bracket located on the opposite side of the dome from the point where the valve 76 is pivotally attached, the free end of such lever 78 lying beneath the valve 76 and acting to close such valve when the lever 78 is swung up on its pivot. Substantially centrally of the lever 78 is an opening through which loosely passes a stem 80 on the upper end of which is a head that rests against the upper edge of the lever. 81 is a comparatively long arm that is pivotally attached at 82 to a bracket 83 projecting from the inner face of the dome near its open lower edge and beneath the pivotal point of attachment of the lever 78. Pivotally attached at 84 to this arm 81 is a short knuckle 85 that is also pivotally attached to the lower end of the stem 80 that passes through and depends from the lever 78. 86 indicates a coiled spring around such rod and interposed between the lever 78 and knuckle 85, which, when the arm 81 is moved up, acts against the lever 78 and causes it to forcibly bear against the valve 76 so that such valve will close the opening 73.

Figure 2:
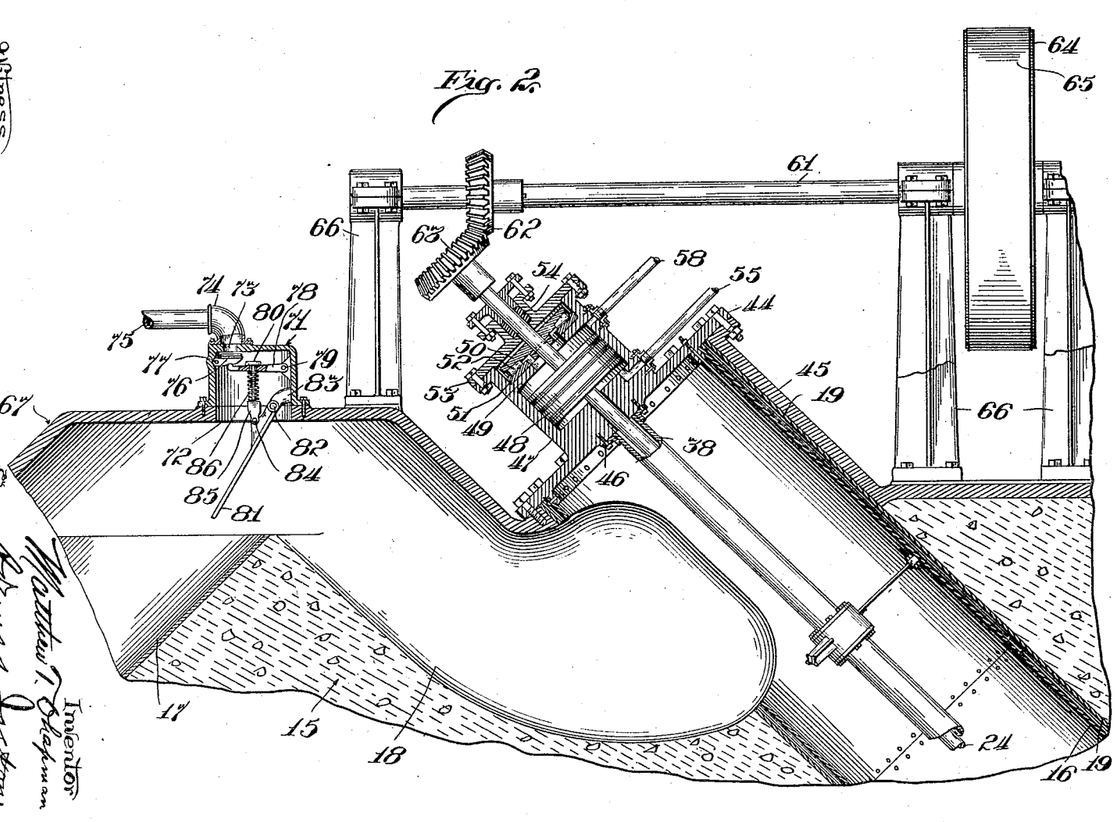
Fig. 2 is an enlarged detail, partly in section and partly in elevation, of the upper end of the suction or inlet pipe, the tube that incloses it, the pump-shaft supporting and driving means, and the automatically-operating means for preventing siphoning of water from the river when the pumping operation has been discontinued.

It is evident that with the pumping mechanism in operation the forcing of the outflowing water against the arm 81 will cause such arm to swing upward on its pivot 82, thereby forcing up the stem 80 which moves freely through its opening in the lever 78, but the effect of the coiled spring 86 will be to force such lever 78 up tightly against the under face of the valve 76, thus causing such valve to close the opening 73. The force of the water being pumped will hold these parts in their raised position at all times during the pumping operation, but upon the stoppage of such pumping operation the parts will fall to substantially the position indicated in Fig. 2 and the valve 76 will open to a slight extent. Upon any reverse movement of the water through the pipes, owing to the siphoning action referred to, the arm 81 will be forced back so as to draw down the retaining lever 78 and thus allow the valve 76 to open sufficiently to insure a free communication between the interior of the water passage and the atmosphere and thus effectually destroy the partial vacuum that would make possible the siphoning action. While the backward flow is thus positively guarded against by insuring the wide opening of the valve 76, such valve will, when the pump is at rest, and the upper portion of the pipe system free from water, remain normally open sufficiently so that upon the commencement of a pumping operation the air in the pipes will be discharged in sufficient quantities through the discharge opening in the dome so that the pumping action may proceed without interference—the valve being closed in the manner described by the effect of the flowing water forced through and rising into the flattened communicating passage 18.

Figure 1:
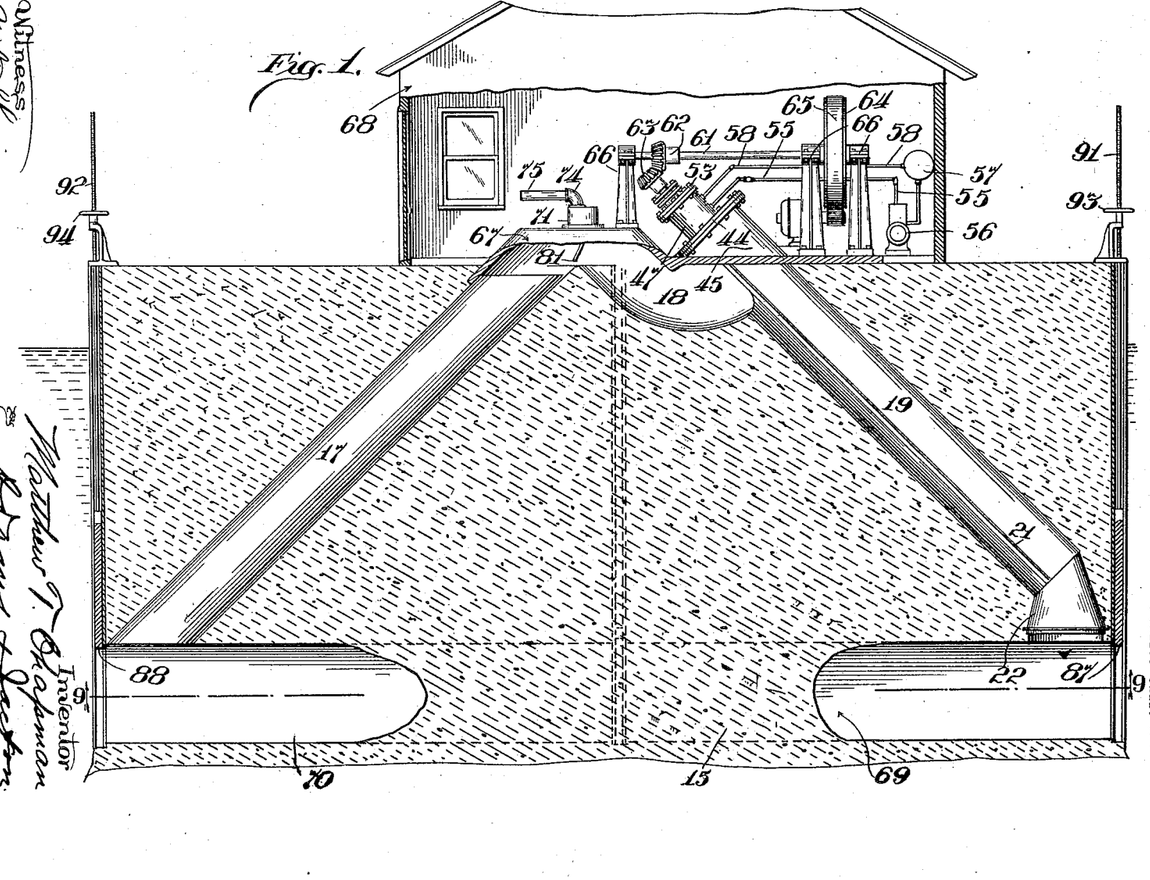
Figure 1 is a view showing in cross-section a levee or embankment along one bank of a river, and which is here preferably of concrete construction to afford a suitable support for the improved pumping apparatus, such apparatus being illustrated as installed thereon and therein.

It is evident that through the two channels 69 and 70 water may be allowed to freely flow in either direction when the height of the water at either side of the levee or embankment will permit, but such flow will ordinarily be prevented by gates moved across such channels. It is desirable at times, however, to draw water from the river and discharge it under pressure upon the land so as to move it readily and rapidly at considerable distances from the levee and embankment for irrigating purposes, and to that end I have provided a series of gates across these two channels by the manipulation of which water from the river may be admitted to the pumping mechanism only, and by such mechanism forced as described upon the land. These gates, in the construction shown, comprise four in number, that indicated by 87 being adapted to close the land side end of the channel 69, and that indicated by 88 being adapted to close the river side end of the channel 70, while those numbered 89 and 90 are located, respectively, in the channels 69 and 70. Each of the gates is movable to open and close it by any suitable means—the means shown being a long rod connected at its lower end to a gate and having its upper screw-threaded end engaged by an operating wheel, the turning of which, of course, raises or lowers the rod as will be understood. In Fig. 1 these rods for the gates 87 and 88 are shown and are indicated by 91 and 92, respectively, and their respective operating wheels are indicated by 93 and 94. In order to perform the operation of pumping the river water onto the land for irrigating purposes, as above suggested, the gates 89 and 90 will be open and the gates 87 and 88 will be closed. It is evident that with such arrangement of the gates water from the river will pass through the channel 69 to the land end thereof, but cannot pass out upon the land, but will be acted upon by the pumping mechanism and drawn up through the suction pipe 16 and connecting pipe 18 and down through the discharge pipe 17 where it will be forced into the channel 70 and through such channel to the land end thereof, from whence it may be conducted by ditches or otherwise to the places on the land where irrigation is desired.

By my invention I provide a rotary pumping mechanism of comparatively simple construction that can be securely installed upon a foundation forming a permanent part of a river levee or embankment and that when installed can be operated to effectively discharge water either from the land to the river or vice versa, and which mechanism is wholly free from the complications and disadvantages incident to the employment of valve devices for controlling the flow of water. Also it is obvious from what has been said that economy in power for operating the pumping mechanism is secured due to the advantage taken of the siphoning principle, but at the same time it is impossible for the tubes to act as a siphon to cause overflowing of the land when the pumping machinery is at rest. It is to be noted also that the construction herein shown and described is an advantageous one in that it makes possible the removal of the suction pipe from its inclosing tube together with the operating elements contained in such suction pipe so as to permit of necessary replacements or repairs. To effect such removal the cover 44 and the parts carried thereby can be unbolted and removed after which the suction pipe and its contained parts can be drawn out lengthwise from the tube 19, such withdrawal being rendered comparatively easy by reason of the resting of the suction pipe on its two rails 20 that move in the guides formed as described in the outer inclosing tube 19.

Figures 11, 12, 13:
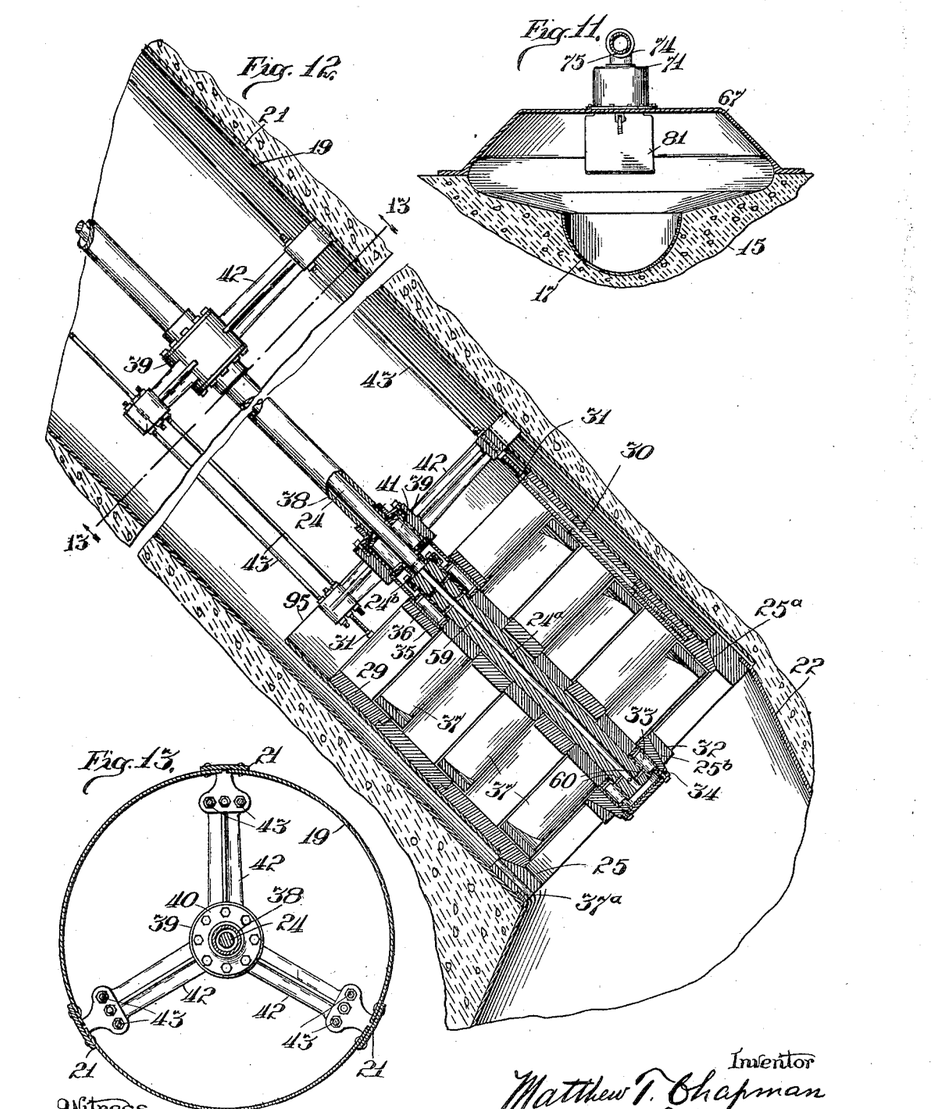
Fig. 11 is a detail, being a vertical cross-section taken at line 11—11 of Fig. 8 and showing the laterally-widened character of the passage that connects the suction and discharge passages.
Fig. 12 is a view very similar to Fig. 3 but showing a modification wherein the suction pipe extending substantially the full length of the outer tube is replaced by a short cylinder or section of pipe of a length sufficient to inclose and carry the rotary pump elements.
Fig. 13 is a cross-section taken at line 13—13 of Fig. 12 and illustrating the manner of slidingly supporting the outer ends of the radial arms of the bearing boxes for the pump-shaft.

In Fig. 12 I have shown a modified form of construction wherein the principal change over the construction already described consists in substituting for the long suction pipe 16 a much shorter pipe or cylinder which is here indicated by 95. Such pipe or cylinder 95 performs the same functions as the pipe 16 of the other construction with respect to supporting the fixed members that coöperate with the rotary propellers and it is made but little longer than is required to afford such support and inclose the propellers. As shown, it projects some little distance higher up in the outer tube 19 than is required for such purpose and it is so made in order that the radial arms of the lowermost bearing box 39 may contact with and project through the wall thereof so that the projecting portions may extend into the longitudinal spaces or joints in the said outer tube for guiding purposes, as hereinbefore described in connection with the other construction. In the first-described construction only the two lowermost ones of said radial arms had projecting ends that acted as guides, but in this modified form I have shown (see Fig. 13) all of such arms of each of the bearing boxes engaging in longitudinal spaces or joints in the outer tube. The short tube or cylinder 95 is, of course, to be understood as a "suction pipe" as that term is used in the following claims inasmuch as through it the water is first drawn, and while its upper end portion is not so directly connected with the narrowed passage 18 that leads to the discharge pipe 17 as in the first-described construction yet of course it is so connected by reason of the flow of water from such shortened suction pipe through the tube 19 to said passage 18, and hence it is to be understood that the claims calling for the passage 18 connecting the upper ends of the suction and discharge pipes are to be construed as covering and applying to both forms of the suction pipe shown. The modified construction is preferable in some situations to the construction that involves the longer pipe inasmuch as it involves less labor in withdrawing the apparatus owing to it being much less in weight. As all of the other parts are the same as in the other figures of the drawings they are indicated by the same reference characters as in those other figures.

What I claim as my invention and desire to secure by Letters Patent, is—

1. A pumping apparatus of the class described, comprising in combination reversely-inclined suction and discharge pipes and a communicating passage connecting the upper ends of such pipes, said passage being of greater diameter horizontally than it is vertically, and having an upper wall with a substantially horizontal surface, rotary propeller means in the lower portion of said suction pipe, means for driving said propeller means, and supports for said driving means secured in part upon said upper wall of the said passage.

2. A pumping apparatus of the class described, comprising in combination suction and discharge pipes having their lower portions below water-level and their upper portions connected by a passageway that is greater in diameter horizontally than vertically, rotary propeller means in the submerged lower end of the suction pipe, means for driving said propeller means, and means secured to the wall of said passageway and actuated by the passing of water therethrough for controlling the admission of air to the said passageway and the pipes communicating therewith.

3. In a pumping apparatus of the class described, the combination of a raised foundation, an inclined suction pipe, guiding means held by said foundation upon which guiding means said suction pipe is adapted to be moved longitudinally, rotary pumping mechanism in the lower end of said pipe, and a discharge pipe connected with the upper portion of said suction pipe.

4. In a pumping apparatus of the class described, the combination of a raised foundation, a supporting and guiding means mounted on said foundation, a suction pipe resting in an inclined position upon and movable lengthwise of said supporting and guiding means, rotary pumping mechanism in the lower end of said pipe, and a discharge pipe connected with the upper portion of said suction pipe.

5. In a pumping apparatus of the class described, the combination of an inclined tube, a suction pipe therein, guiding means on said pipe and tube respectively for facilitating endwise movement of the pipe in the tube, rotary pumping mechanism in the lower end of said pipe, and a discharge pipe connected with the upper portion of said suction pipe.

6. In a pumping apparatus of the class described, the combination of an inclined tube, a suction pipe therein, interlocking means carried by said pipe and tube respectively for holding said pipe against rotary movement but facilitating its endwise movement in the tube, rotary pumping means in the lower end of said pipe, and a discharge pipe connected with the upper portion of said suction pipe.

7. In a pumping apparatus of the class described, the combination of a longitudinally-slotted inclined tube, a suction pipe therein, a guiding device secured on the outer face of said pipe and projecting into the slot of said tube to facilitate endwise movement of the pipe in the tube and preventing rotary movement thereof, rotary pumping mechanism in the lower end of said pipe, and a discharge pipe connected with the upper portion of said suction pipe.

8. In a pumping apparatus of the class described, the combination of an inclined tube formed of sheets with separated longitudinal edges, a bridge piece secured on the outer face of the tube over the space between such separated edges, a suction pipe in said tube, a guiding device secured to the outer face of said pipe and projecting between said separated and bridged edges of the tube, rotary pumping mechanism in the lower end of said pipe, and a discharge pipe connected with the upper portion of said suction pipe.

9. In a pumping apparatus of the class described, the combination of an inclined suction pipe, a supporting member therefor, interengaging devices between said pipe and member to prevent rotary movement of the pipe and aid in its insertion in and removal from operative position, rotary pumping mechanism in the lower end of said pipe, and a discharge pipe connected with the upper portion of said suction pipe.

10. In a pumping apparatus of the class described, the combination of an inclined suction pipe, rotary pumping mechanism in the lower portion of said pipe, a shaft in said pipe for driving said pumping mechanism, a bearing for the shaft having an arm projecting at its outer end through the wall of said pipe, a supporting member for said pipe having a longitudinal groove therein into which said projecting end of the arm extends to hold said bearing against rotary movement, and a discharge pipe connected with the upper portion of said suction pipe.

11. In a pumping apparatus of the class described, the combination of an inclined suction pipe, rotary pumping mechanism in the lower portion of said pipe, a shaft in said pipe for driving said pumping mechanism, a bearing for the shaft having an arm projecting at its outer end through the wall of said pipe, a supporting member for said pipe having a longitudinal groove therein into which said projecting end of the arm extends to hold said bearing against rotary movement, a guiding device secured to the outer face of said pipe and also entering said groove to hold said pipe against rotary movement and aid in moving it lengthwise on said support, and a discharge pipe connected with the upper portion of said suction pipe.

12. In a pumping apparatus of the class described, the combination of an inclined suction pipe, a tube surrounding said pipe, said tube having two longitudinal slots therein, strips secured to the outer face of said tube and forming bridging mmbers over said slots, projections on the outer face of said pipe for entering said slots to guide said pipe when being moved into and out of said tube, rotary pumping mechanism in the lower part of said pipe, a shaft in said pipe for driving said pumping mechanism, a bearing for the shaft having two arms that project at their outer ends through the wall of said pipe and enter respectively the two slots in the tube to hold said bearing against rotary movement, and a discharge pipe connected with the upper portion of said suction pipe.

13. A submerged rotary pumping means comprising pump suction and discharge pipes, a driving shaft and pumping mechanism connected with said shaft, the ends of the suction and discharge pipes extending below the surface of the water to be pumped, in combination with a mechanical and a liquid end thrust bearing for sustaining the end thrust of the shaft, bearings for the shaft, a lubricant-conducting pipe surrounding the shaft and connected to said shaft bearings for conducting lubricant to such bearings, and means for forcing a lubricant to said end thrust bearings and from said bearings to the remaining bearings.

14. A submerged rotary pumping means comprising pump suction and discharge pipes, a driving shaft and pumping mechanism connected with said shaft, all of said parts being mounted in an inclined position, the said pumping mechanism and the ends of the suction and discharge pipes extending below the surface of the water to be pumped, in combination with a mechanical and liquid end thrust bearing in communication with each other and adapted to support the end thrust of the shaft, bearings for the shaft, and a pipe surrounding the shaft and connecting shaft bearings to each other, and also conducting lubricant from the end thrust bearings to the shaft bearings.

15. A submerged rotary pumping means comprising pump suction and discharge pipes, a driving shaft and pumping mechanism connected with said shaft, all of said parts being mounted in an inclined position, said pumping mechanism and the ends of the suction and discharge pipes extending below the surface of the water to be pumped, in combination with mechanical and liquid end thrust bearings for supporting the end thrust of the shaft, other bearings for the shaft, and a pipe casing inclosing the shaft and leading from the liquid bearing for conducting lubricant to the said second-named bearings and from such bearings through openings in the lower portion of the shaft, on which lower portion is mounted the said pumping mechanism, to still another bearing for the shaft adjacent to said mechanism.

16. A submerged rotary pumping means comprising in combination a suction and a discharge pipe, a shaft and rotary propeller means connected with said shaft, the propeller means and the ends of the suction and discharge pipes extending below the surface of the water to be pumped, mechanical and liquid end thrust bearings for supporting the end thrust of the shaft, other bearings for the shaft, and a pipe casing inclosing the shaft for conducting lubricant from said liquid bearings to the said last-named bearings and from such bearings through openings in the lower portion of the shaft, on which lower portion is mounted the propeller means, to a bearing for the shaft that is adjacent to the said propellers.

MATTHEW T. CHAPMAN.